US008027552B2

(12) United States Patent
McNie et al.

(10) Patent No.: US 8,027,552 B2
(45) Date of Patent: Sep. 27, 2011

(54) MONOLITHIC OPTICAL TRANSMITTER AND RECEIVER APPARATUS INCORPORATING HOLLOW WAVEGUIDES

(75) Inventors: Mark E McNie, Malvern (GB); Richard M Jenkins, Malvern (GB)

(73) Assignee: Qinetiq Limited, London (GB)

( * ) Notice: Subject to any disclaimer, the term of this patent is extended or adjusted under 35 U.S.C. 154(b) by 531 days.

(21) Appl. No.: 10/565,152

(22) PCT Filed: Jul. 23, 2004

(86) PCT No.: PCT/GB2004/003192
§ 371 (c)(1),
(2), (4) Date: Jan. 19, 2006

(87) PCT Pub. No.: WO2005/012970
PCT Pub. Date: Feb. 10, 2005

(65) Prior Publication Data
US 2006/0171626 A1 Aug. 3, 2006

(30) Foreign Application Priority Data
Jul. 28, 2003 (GB) .................................. 0317630.2

(51) Int. Cl.
*G02B 6/12* (2006.01)
(52) U.S. Cl. .................. 385/14; 385/2; 385/3; 385/15; 385/129; 385/132
(58) Field of Classification Search .................. None
See application file for complete search history.

(56) References Cited
U.S. PATENT DOCUMENTS
3,984,332 A * 10/1976 Nelson et al. ................. 250/368
(Continued)

FOREIGN PATENT DOCUMENTS
WO 99/42879 8/1999
(Continued)

OTHER PUBLICATIONS

R.M. Jenkins et al., "A Hollow Waveguide Integrated Optic Subsystem for a 10.6 um Range-Doppler Imaging Lidar", 2000, Proceedings of SPIE, vol. 4034, pp. 108-113.*
Krippner et al., "Microspectrometer System for the Near Infrared Wavelength Range based on the LIGA Technology", 2000, Proceedings of SPIE, vol. 3912, pp. 141-149.*
R. Foord, et al., "A Hollow Waveguide Integrated Optic System with an Integrated Laser Source", 2000, Proceedings of SPIE, vol. 4035, pp. 346-353.*

(Continued)

*Primary Examiner* — Michelle R. Connelly-Cushwa
*Assistant Examiner* — Chad H Smith
(74) *Attorney, Agent, or Firm* — Nixon & Vanderhye P.C.

(57) ABSTRACT

A transmitter apparatus (2) is described that comprises one or more lasers (4), modulation means (10) to intensity modulate radiation output by each of said one or more lasers (4), and output means for outputting the modulated radiation produced by the modulation means into, for example, an optical fiber (22). The apparatus comprises hollow core optical waveguides (20) formed in a substrate (18) which, in use, guide radiation from the one or more lasers (4) to the modulation means (10) and from the modulation means (10) to the output means. An associated receiver apparatus (30) is also described that comprises one or more detectors (32) and one or more optical fiber attachment means, the one or more optical fiber attachment means being arranged to receive one or more one optical fibers (42). The receiver is characterized in that radiation is guided from the one or more optical fibers (42) to the one or more detectors (32) by at least one hollow core optical waveguide (40) formed in a substrate. A combined receiver/transmitter apparatus (70) is also shown.

42 Claims, 2 Drawing Sheets

U.S. PATENT DOCUMENTS

| | | | | |
|---|---|---|---|---|
| 4,583,539 | A | * | 4/1986 | Karlin et al. .................. 606/4 |
| 5,381,426 | A | * | 1/1995 | Fontana et al. ................ 372/18 |
| 5,410,625 | A | * | 4/1995 | Jenkins et al. ................. 385/28 |
| 5,428,698 | A | * | 6/1995 | Jenkins et al. ................. 385/27 |
| 5,473,721 | A | | 12/1995 | Myers et al. |
| 5,515,464 | A | * | 5/1996 | Sheem .......................... 385/49 |
| 5,525,190 | A | * | 6/1996 | Wojnarowski et al. ....... 385/133 |
| 5,917,596 | A | * | 6/1999 | Jenkins et al. ................ 356/491 |
| 6,090,636 | A | * | 7/2000 | Geusic et al. ................. 438/31 |
| 6,577,400 | B1 | * | 6/2003 | Klaver .......................... 356/477 |
| 6,643,309 | B1 | * | 11/2003 | Gotoda ....................... 372/50.11 |
| 6,765,663 | B2 | * | 7/2004 | Byren et al. .................. 356/152.1 |
| 6,934,448 | B2 | | 8/2005 | Akashi et al. ................. 385/49 |
| 6,944,377 | B2 | * | 9/2005 | Umebayshi et al. .......... 385/49 |
| 2005/0089262 | A1 | * | 4/2005 | Jenkins et al. ................ 385/14 |
| 2005/0213880 | A1 | * | 9/2005 | Jones ............................ 385/30 |

FOREIGN PATENT DOCUMENTS

| | | | |
|---|---|---|---|
| WO | WO 9942879 | * | 8/1999 |
| WO | 03/065091 | | 8/2003 |

OTHER PUBLICATIONS

R.M. Jenkins et al., A Hollow Waveguide Integrated Optic Subsystem for a 10.6 micron Range-Doppler Imaging Lidar, 2000, Proceedings of SPIE, vol. 4034, pp. 108-113.*

R. Foord et al., A Hollow Waveguide Integrated Optic System with an Integrated Laser Source, 2000, Proceedings of SPIE, vol. 4035, pp. 346-353.*

Foord et al. ("A Hollow Waveguide Integrated Optic System with at Integrated Laser Source", Proceeding of SPIE, vol. 4035 (2000), pp. 346-353).*

Jenkins et al. "A Hollow Waveguide Integrated Optic System for a 10.6 um Range-Doppler Imaging Lidar", Proceeding of SPIE, vol. 4034 (2000) pp. 108-113).*

International Search Report for PCT/GB2004/003192 dated Nov. 12, 2004.

UK Search Report for GB 0317630.2 dated Oct. 13, 2003.

Krippner et al., *Microspectrometer System for the Near Infrared Wavelength Range based on the LIGA Technology*, Proc SPIE Int Soc Opt Eng; vol. 3912, Jan. 26, 2000, pp. 141-149, XP002299861.

Jenkins et al., *A Hollow Waveguide Integrated Optic Subsystem for a 10.6μm Range-Doppler Imaging Lidar*, Proceedings of the SPIE, vol. 4034, Apr. 24, 2000, pp. 108-113, XP002299729.

Young et al., *A 16×1 WDM Transmitter with Integrated DBR Lasers and Electroabsorption Modulators*, Integrated Photonics Research, vol. 10, 1993, pp. 414-417, XP000472984.

Patent Abstracts of Japan, vol. 1999, No. 2, Feb. 26, 1999 & JP 10 311921, Nov. 24, 1998.

Jenkins et al., *Hollow Waveguide Integrated Optic Systems with Integrated Laser Sources for 10.6 micron Laser Radar*, 2000 Conference on Lasers and Electro-Optics Europe (Cat. No. 00TH9505), Sep. 15, 2000, p. 1, XP002300366.

* cited by examiner

MONOLITHIC OPTICAL TRANSMITTER AND RECEIVER APPARATUS INCORPORATING HOLLOW WAVEGUIDES

This application is the U.S. national phase of international application PCT/GB2004/003192 filed 23 Jul. 2004 which designated the U.S. and claims benefit of GB 0317630.2 filed 28 Jul. 2003, the entire contents of each of which are hereby incorporated by reference.

The present invention relates to optical transmitter and receiver apparatus, and more particularly to such apparatus for use in telecommunication systems and the like.

Optical transmitter and receiver systems for use in optical fibre based telecommunication networks are well known. A typical transmitter system comprises a number of optical components (e.g. laser, optical modulator, wavelength filters, etc) that are arranged to produce a laser beam that is intensity modulated to carry information. The modulated laser beam is coupled into a length of optical fibre and carried to a remote receiver system that typically comprises a number of optical components arranged to extract the information carried by the modulated laser light.

Transmit and receive circuits have previously been implemented using optical components rigidly held in place with light coupled between them in free space. However, maintaining the necessary alignment of such components can prove difficult especially when the arrangement is subjected to mechanical shock. It is also known, and more common in the art, to optically couple the required optical components together using short lengths of optical fibre. Although such an implementation provides circuits having increased robustness, it is difficult to make such arrangements compact. Furthermore, the optical losses associated with the various optical fibre interfaces can dramatically reduce device performance, and the complexity/cost of actively aligning free-space or fibre coupled components is also high.

It is an object of the present invention to mitigate at least some of the disadvantages of known transmitter and receiver systems.

According to a first aspect of the invention, transmitter apparatus comprises one or more lasers, modulation means to intensity modulate radiation output by each of said one or more lasers and output means for outputting the modulated radiation produced by the modulation means, characterised in that the apparatus comprises hollow core optical waveguides formed in a substrate which, in use, guide radiation from the one or more lasers to the modulation means and from the modulation means to the output means.

Transmitter apparatus is thus provided that can be used to produce a modulated light signal for further transmission; for example down an optical fibre or through free-space. The guiding of light within hollow core waveguides formed in a substrate provides a more compact and robust optical arrangement than prior art free-space or optical fibre coupled systems. Hollow core waveguide also allow higher optical power to be transmitted than solid core waveguides. Furthermore, the number of fibre end reflections are reduced compared to prior art fibre coupled systems thereby decreasing the optical losses associated with the apparatus.

It should be noted that when hollow core optical waveguide structures are produced, the hollow core is likely to fill with air. However, this should be seen in no way as limiting the scope of this invention. The hollow core may contain any fluid (for example a liquid or an inert gas such as nitrogen) or be a vacuum. The term hollow core simply means a core which is absent any solid material. Furthermore, the terms "light" and "optical" are used herein to refer to any electromagnetic radiation having a wavelength from the deep ultraviolet to the far infra-red.

Advantageously, at least one of the one or more lasers and the modulation means is a discrete component this may be conveniently located in an alignment slot formed in the substrate. In other words, the lasers and/or optical modulators of the modulation means are hybrid optical components preferably located in alignment slots formed in the substrate. The alignment slots are appropriately shaped to accept the component and may thus be deeper/shallower and/or wider/narrower than the various hollow core optical waveguides as necessary. Spring clips or micro-grippers may be used to secure the components in place.

Furthermore, the alignment slot may also be fabricated with sufficient accuracy to align the optical component that it receives. Placing an optical component in such an alignment slot will thus inherently align the optical component and a component alignment or adjustment step is not required. In other words, the present invention may provide passive alignment of optical components instead of requiring an active alignment step in which the position of a component is adjusted (e.g. by hand) until the desired alignment is achieved. Conventional pick and place techniques of the type used in the manufacture of electronic circuits and the like could be used to place the optical components in the associated alignment slot. Alternatively, pick and place techniques may provide the necessary alignment. For example, a component could be accurately aligned when placed and then fixed (e.g. glued) to remain in alignment. Surface tension alignment techniques (e.g. solder reflow) may also be used to align components such as lasers etc.

The alignment slots and (especially) the optical components are manufactured with a certain size tolerance. The coupling efficiency between a optical component and an associated hollow core optical waveguide will reduce as the angular error of alignment of the optical component with respect to the hollow core waveguide increases. However, reduction of the cross-sectional dimensions of the hollow core waveguide will increase the acceptable angular alignment tolerance, albeit at the expense of slightly increased losses in the optical waveguide due to the reduced core dimensions and increased (tighter) lateral alignment tolerances. Therefore, knowledge of the alignment tolerances that will be achieved with a certain optical component (e.g. from knowledge of the manufacturing tolerances of the optical component) will permit the dimensions of the hollow core waveguide to be selected to ensure a high coupling efficiency. Alignment slots of this type may also be used to hold the various optical components (e.g. optical isolators, lenses, beam combining means, detectors, wavelength filters etc) described below.

Conveniently, at least one of the one or more lasers and the one or more optical modulators is a monolithic component formed in the substrate. Hence, if a suitable substrate material(s) is used, any one of the one or more lasers and the one or more optical modulators may be monolithically formed in/from the substrate. As described below in relation to lid/base configurations the substrate may comprise regions consisting of material (e.g. GaAs) in which monolithic components may be formed. A combination of hybrid and monolithic components is also possible.

Advantageously, the output means is arranged to couple the modulated radiation into at least one output optical fibre. Preferably, the output means comprises at least one optical fibre attachment means to provide both optical and mechanical attachment of the fibre to the apparatus. Each optical fibre attachment means may comprise an alignment slot or V-groove formed in the substrate that is arranged to hold a solid core optical fibre in place thereby allowing optical inputs/outputs to be made to the apparatus. Stepped optical fibre alignment slots may also be provided to hold both the buffer layer and the cladding. Spring clips or micro-grippers may also be provided to secure the optical fibre in place.

The alignment of the core of a hollow core optical fibre with a hollow core waveguide of the apparatus, achieved for example by clamping the optical fibre cladding in a alignment slot, would also be advantageous as the air core to air core connection would be free from any unwanted reflections. However, the skilled person would recognise that the use of hollow core optical fibres is only likely to be practical for multi-mode waveguide applications.

To provide efficient coupling between the core of an optical fibre and the hollow core waveguide of the optical circuit, the cross-section of the hollow core waveguide should be appropriate for the cross-section of the optical fibre core. In the case of solid core fibres, leakage into the cladding means that the width of the mode carried by the fibre is actually greater than the core diameter; for example typically the 10 µm solid core of a single mode glass fibre has a total field width of around 14 µm diameter.

If the mode width of the fibre is different to that of the hollow core waveguide, the at least one optical fibre attachment means may advantageously be arranged to receive a lensed output optical fibre. Lensed fibres allow the optical field to be expanded or reduced as appropriate to enable light to be coupled to/from fibres with a different size core to that of the hollow core waveguide.

The at least one optical fibre attachment means may also advantageously comprise a mode matching mean. The mode matching means may comprise discrete lenses (e.g. ball or GRIN rod etc) that are located in the substrate and used to reduce/expand the optical field from a fibre end as required. The lenses may carry an anti-reflection coating. The mode matching means may alternatively or additionally comprise a tapered hollow waveguide section to expand/reduce the optical field as it propagates through the device.

Conveniently, the apparatus comprises one laser. The single wavelength modulated laser output may then be coupled, for example, into a single optical fibre. The apparatus thus provides a discrete single wavelength transmitter module. The skilled person would appreciate that such a module may be co-located with other single wavelength transmitter modules (possibly also according to the present invention) the outputs of which may be fed, via optical fibre, to a beam combiner.

Advantageously, a plurality of lasers may be provided. Typically, each laser will have one associated optical modulator to permit separate data to be carried by the light produced by each laser. Each of said plurality of lasers may conveniently have a different output wavelength such that the apparatus may be used to generate two or more wavelength channels for transmission down a single optical fibre.

Beam combining means may also be advantageously provided. The beam combining means may be arranged to combine the plurality of modulated beams into a combined beam, wherein said combined beam is coupled into a single output optical fibre. In this manner, a number of wavelength channels can be transmitted down a single transmission fibre.

Conveniently, each of said plurality of modulated beams is coupled into one of a plurality of output optical fibres. A separate (e.g. fibre coupled) beam combining means may also be provided to combine the plurality of single wavelength channels carried by each separate output fibre of the apparatus.

Advantageously, one of said one or more lasers is a semiconductor laser and preferably said semiconductor laser is a wavelength tunable semiconductor laser. The use of at least one wavelength tunable laser provides flexibility over the wavelength channels provided by the apparatus. For telecommunication applications, the wavelengths output by the laser(s) is typically within the 1.4 µm to 1.6 µm telecommunications wavelength band.

Advantageously, one or more detectors are provided to monitor the intensity of radiation output by said one or more lasers. An optical tap may be provided to extract light from the hollow core optical waveguide for direction to the detector. The optical tap may advantageously be a beam splitter or a hollow core multi-mode interference (MMI) device of the type described in GB2003/000331 and GB2003/000370.

Conveniently, the apparatus further comprises at least one optical isolator. The provision of an optical isolator ensures reflections within the apparatus are not coupled back into the laser where they may be amplified further. A combined laser and optical isolator package may also be used.

The output provided by certain types of laser, in particular semiconductor lasers, has a certain beam shape dictated by the laser structure. Therefore, one or more beam shaping means may be advantageously provided. Beams shaping means will allow the shape of the beam to be matched to the optimum beam shape that can be coupled into the associated hollow core optical waveguide. This further reduces the optical losses of the apparatus.

Advantageously, at least one of said laser beam shaping means comprise one or more lenses. For example, cylindrical or ball lenses could be used. At least one of the beam shaping means may also or alternatively comprise a tapered hollow core optical waveguide. The taper may be in one or two dimensions. For example, in the case of a waveguide of rectangular cross-section the waveguide width may be tapered whilst the waveguide depth is invariant.

A number of beam shaping means may also be provided between the various components of the apparatus. For example, a semi-conductor laser may produce a 3 µm by 10 µm laser beam which is re-shaped to a beam of 4 µm radius for optimum transmission through an optical modulator. After passing through the optical modulator, the beam may be reshaped again to optimise coupling efficiency into an optical fibre.

Conveniently, said modulation means comprises one or more electro-optic modulators. For example, Gallium Arsenide (GaAs) electro-optic modulators. A number of alternative modulators, for example a Lithium Niobate bulk modulator or a electro-absorption modulator (EAM), could be used. Typically, a digital control signal is applied to the modulator so that a digital intensity modulation (i.e. 0 or 1) is applied to the output of the associated laser.

According to a second aspect of the invention, transmitter apparatus comprises at least one laser capable of producing intensity modulated radiation and output means for coupling the radiation produced by the laser into at least one output optical fibre characterised in that the apparatus comprises hollow core optical waveguides formed in a substrate which, in use, guide radiation from the at least one laser to the at least one optical fibre.

Transmitter apparatus is thus provided that uses a modulated laser to produce a modulated light signal for transmission down an optical fibre. The guiding of light within hollow core waveguides formed in a substrate provides a more compact and robust optical arrangement than prior art free space or optical fibre coupled systems. Hollow core waveguide also allow higher optical power to be transmitted than solid core waveguides. Furthermore, the number of fibre end reflections are reduced compared to prior art fibre coupled systems thereby decreasing the optical losses associated with the apparatus.

The output means may comprise at least one fibre attachment means. The at least one optical fibre attachment means may advantageously be arranged to receive a lensed output optical fibre, and/or may comprise mode matching means as described above.

According to a third aspect of the invention, receiver apparatus comprises one or more detectors and one or more optical fibre attachment means, the one or more optical fibre attachment means being arranged to receive one or more one optical fibres, characterised in that radiation is guided from the one or more optical fibres to the one or more detectors by at least one hollow core optical waveguide formed in a substrate.

A receiver is thus provided that detects optically modulated signals received from an optical fibre and converts such signals into electrical analogues. The guiding of light within hollow core waveguides formed in a substrate provides a more compact and robust optical arrangement than prior art free space or optical fibre coupled systems. Hollow core waveguide also allow higher optical powers to be received than solid core waveguides. Furthermore, the number of fibre end reflections are reduced compared to prior art fibre coupled systems thereby decreasing the optical losses associated with the apparatus.

The fibre attachment means may comprise any of the fibre attachment means described above for the transmitter apparatus.

Advantageously, the apparatus comprises a plurality of detectors enabling multiple optical signal (e.g. different wavelength channels) to be detected. The apparatus may comprise a plurality of optical fibre attachment means that are arranged to receive a plurality of optical fibres; each of said plurality of optical fibres may then be guided to one of the plurality of detectors.

Alternatively, one optical fibre attachment means is conveniently provided, said optical fibre attachment means being arranged to receive one optical fibre carrying radiation comprising a plurality of different wavelength channels. The apparatus advantageously further comprises wavelength de-multiplexing means, said wavelength de-multiplexing means being arranged to separate said different wavelength channels and to direct each wavelength channel to one of the plurality of detectors. In other words, the apparatus performs a detection and de-multiplexing function.

Advantageously, at least one variable optical attenuator is provided and is arranged to allow controllable attenuation of the radiation received from said at least one optical fibre.

Conveniently, at least one wavelength selective filter is also provided to ensure only radiation of the required wavelength is directed to the detector.

Advantageously, the at least one optical fibre attachment means comprises a mode matching means; e.g. of the type describe above in relation to the transmitter apparatus. The at least one optical fibre attachment means may conveniently be arranged to receive a lensed optical fibre.

According to a fourth aspect of the invention, transmit/receive apparatus is provided that comprises transmitter apparatus according to the first or second aspect of the invention and receiver apparatus according to the third aspect of the invention. Advantageously, the transmitter apparatus and the receiver apparatus are formed on a common substrate thereby forming integrated transmit/receive apparatus. The integrated transmit/receive apparatus may also comprises a demultiplexer and/or a multiplexer. A bypass hollow core waveguide may also be provided.

Advantageously, the apparatus is formed in a substrate comprising semiconductor material. Semiconductor substrates, such as Silicon, can conveniently be etched to provide hollow core waveguides with high accuracy using micro-fabrication techniques. The substrate may advantageously comprise a multiple layer wafer; for example SiGe, silicon-on-insulator (SOI), silicon-on-glass or GaAs-on-silicon. A person skilled in the art would recognise that micro-fabrication techniques typically involve a lithography step to define a pattern, followed by an etch step to transfer the pattern in to one or more layers on, or in, the substrate material. The lithography step may comprise photolithography, x-ray or e-beam lithography. The etch step may be performed using ion beam milling, a chemical etch or a dry plasma etch. Advantageously, the optical circuit is formed by deep reactive ion etching (also termed a deep dry etch or a deep silicon etch). Micro-fabrication techniques of this type are also compatible with various layer deposition techniques such as sputtering, CVD and electro-plating.

Although substrates that comprise semiconductor material can advantageously be used, the device could also be formed on a variety of alternative substrate. For example, quartz, silica or glass substrates could be used. Conveniently, the substrate used in the present invention can readily have semiconductor processing techniques applied thereto. It should be noted that although semiconductor processing techniques are, by definition, developed for use with semiconductor substrates they may also be advantageously applied to certain non-semiconductor substrates where the semiconductor properties of the substrate are not required.

Advantageously, the hollow core optical waveguides of the apparatus have a substantially rectangular (which herein shall include square) cross-section. A square, or almost square, cross-section hollow core waveguide provides a waveguide in which the losses are substantially polarisation independent and is preferred when the polarisation state of the light is unknown or varying. Dimensioning the waveguide to have a depth greater than its width increases polarisation dependent losses, but may be advantageous when the polarisation state of light propagating through the waveguide is known. Although rectangular cross-section waveguides are convenient, many alternative waveguide shapes could be employed. For example, circular, elliptical or v-shaped waveguides could be provided.

Advantageously, the hollow core optical waveguides are dimensioned to preferably guide radiation propagating in the fundamental mode (i.e. higher order mode are highly attenuated by the waveguide). Alternatively, the hollow core optical waveguides may be arranged to support the propagation of multiple modes but the apparatus arranged such that light is coupled into the waveguides in a manner which excites only the fundamental mode therein. For light in the 1.4 µm to 1.6 µm telecommunications band, a multi-mode hollow core optical waveguide preferably has a cross-sectional dimension greater than 50 µm, more preferably greater than 100 µm and more preferably greater than 150 µm.

Conveniently, the internal surfaces of the hollow core optical waveguides carry a reflective coating. The material providing the reflective coating may be a layer of metal such as gold, silver or copper. Metals will exhibit a suitably low refractive index over a wavelength range that is governed by the physical properties of the metal; standard text books such as "the handbook of optical constants" by E. D. Palik, Academic Press, London, 1998, provide accurate data on the wavelength dependent refractive indices of various materials. In particular, gold has a refractive index less than that of air at wavelengths within the range of around 500 nm to 2.2 µm; this encompasses wavelengths within the important telecommunications band of 1400 nm to 1600 nm. Copper exhibits a refractive index less than unity over the wavelength range of 560 nm to 2200 nm, whilst silver has similar refractive index properties over a wavelength range of 320 nm to 2480 nm.

A layer of metal may be deposited using a variety of techniques known to those skilled in the art. These techniques include sputtering, evaporation, chemical vapour deposition (CVD) and (electro or electro-less) plating. CVD and plating techniques allow the metal layers to be deposited without significant direction dependent thickness variations. Sputtering using a rotating sample and/or source would also provide more even coverage. Plating techniques are especially advantageous as they permit batch (i.e. multi-substrate parallel) processing to be undertaken. In particular, electro-less plating is preferred for conformality.

A skilled person would recognise that adhesion layers and/or barrier diffusion layers could be deposited prior to depositing the layer of metal. For example, a layer of chrome or titanium could be provided as an adhesion layer prior to the deposition of gold. A diffusion barrier layer, such as platinum, may also be deposited on the adhesion layer prior to gold deposition. Alternatively, a combined adhesion and diffusion layer (such as titanium nitride, titanium tungsten alloy or an insulating layer) could be used.

The reflective coating may also be provided by a stack of layers of any one or more of metal, dielectric, or semiconductor; for example dielectric stacks or metal-dielectric stacks may be provided. The reflective properties of any multiple layer stack may also be dependent, to some extent, on the properties of the material on which they are deposited. Hence, the material of the substrate may also form a base layer, and be a part of, any such multiple layer stack.

In the case of a dielectric stack, a person skilled in the art would recognise that the optical thickness of a dielectric layer(s) provides an interference effect that will determine the reflective properties of the coating. The dielectric material may be deposited by CVD or sputtering or reactive sputtering. Alternatively, a dielectric layer could be formed by chemical reaction with a deposited metal layer. For example, a layer of silver could be chemically reacted with a halide to produce a thin surface layer of silver halide.

If a reflective coating is provided, the number of material that can be used to form the substrate is greatly increased. For example, plastic waveguide apparatus may be fabricated by techniques including hot embossing or injection moulding. The technique involves forming a master. The master may be formed in semiconductor material, such as silicon, using a deep dry etch. Alternatively, the master may be formed by electro deposition of layers using the LIGA or UV LIGA technique. Once the master is formed, the hollow core waveguides may be formed in a plastic substrate by stamping (i.e. pressing) or hot stamping. A master may also be fabricated which is suitable for forming a sub-master that can be used to form the hollow core waveguides in the plastic substrate. Hollow plastic waveguides can thus be formed and coated with a reflective coating. The plastic hollow core waveguides that carry the reflective coating may also be formed from plastic or a polymer. For example, the hollow core waveguides could be formed using a lithographic process on a "spin-on" polymer coating (e.g. SU8 available from Microchem. Corporation)

Conveniently, the substrate comprises a base portion and a lid portion. In other words, two pieces of material may be combined to form the hollow core waveguide structures of the apparatus. The base portion may be formed from a different material to the lid portion. This would allow, for example, the hollow core waveguide and certain optical components to be formed in a base portion (e.g. made of silicon) whilst certain electronic and/or electro-optic components (e.g. photo-diode/laser etc) are formed in a GaAs lid portion. Alternatively, all the optical components and channels may be formed in the base portion whilst a substantially flat piece of material forms the lid portion; this arrangement would not require any lid/base alignment step during assembly. Such arrangements provide a convenient means of producing the necessary hollow core waveguides and are described in more detail in PCT patent application GB2003/000331.

The invention will now be described, by way of example only, with reference to the accompanying drawing.

Figure 1:
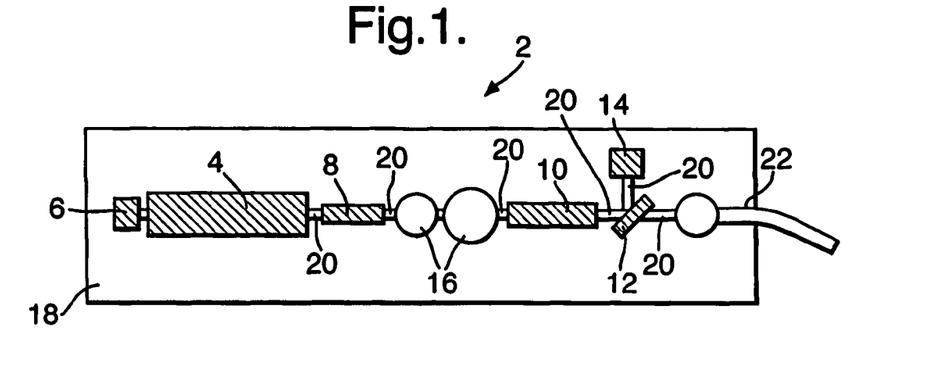
FIG. 1 which shows a hollow waveguide transmitter module according to the present invention.

Referring to FIG. 1 a transmitter module 2 according to the present invention can be seen to comprise a plurality of optical components; namely a semiconductor laser source 4, a first detector 6, an optical isolator 8, a GaAs electro-optic modulator 10, a beam splitter 12, a second detector 14 and ball lenses 16. The optical components are held in alignment slots formed in a base portion of a silicon substrate 18. Hollow core optical waveguides 20 are also formed in the base portion of the substrate 18 and are arranged to optically link the various optical components.

In use, the laser source 4 generates light that is coupled, via hollow core optical waveguide, to the first detector 6 and also to the optical isolator 8. After passing through the optical isolator 8 and two ball lenses 16 the light is modulated by the GaAs electro-optic modulator 10. A small portion of the modulated light is routed, via the beam splitter 12, to a second detector 14 whilst the remaining modulated light is coupled into a lensed optical fibre 22. The first detector 6 allows the raw laser output power to be monitored, whilst the second detector 14 is provided to monitor the intensity of the modulated laser beam.

Figure 2:
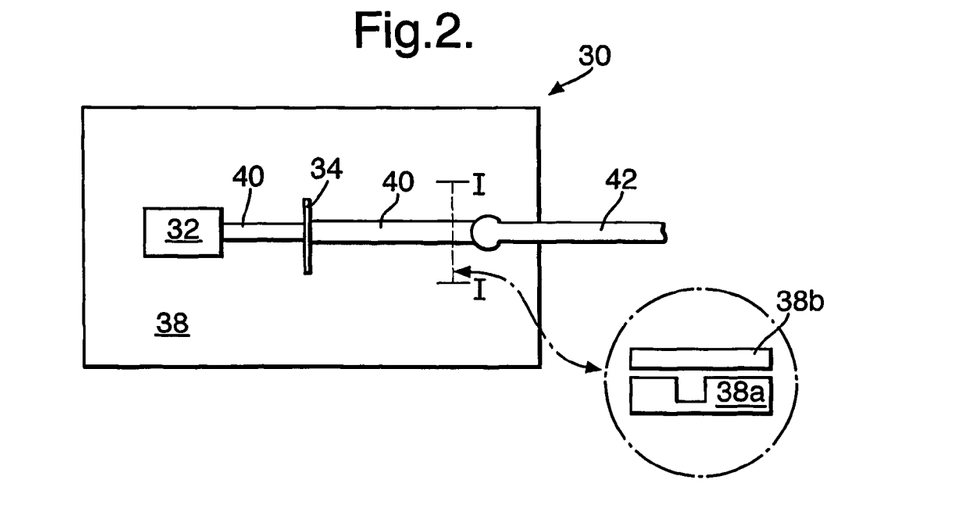
FIG. 2 shows a hollow waveguide receiver module according to the present invention.

Referring to FIG. 2, a receiver module 30 according to the present invention is shown. The receiver module 30 comprises a number of optical components, namely a detector 32 and a filter 34. The optical components are held in alignment slots formed in a base portion of a silicon substrate 38 and hollow core optical waveguides 40 are used to optically link the various optical components.

In use, modulated light from a lensed input optical fibre 42 is coupled into the hollow core optical waveguide 40 and guided to the detector 32 where the modulated signal carried by the light is converted into an electrical signal.

The hollow core waveguides of the transmitter and receiver modules are formed from substrates having a base portion and a lid portion; for example, as shown in the sectional view of the receiver in FIG. 2, a base portion 38a and a lid portion 38b. Typically, alignment slots are provided in the base portion to receive the various discrete optical components of the circuit. The alignment slots are provided with sufficient accuracy that the component self-align when placed in there respective slots. This passive alignment ensures the optical components are aligned with respect to the hollow waveguides of the substrate without the need for an active alignment step prior to component attachment. The skilled person would appreciate that certain optical structures could alternatively be formed monolithically from the substrate.

The lid portion may simply comprise a substantially flat piece of material that is attached (e.g. glued using a layer of epoxy) to the base portion in order to fully define the hollow core waveguides. Alternatively, optical components or structures (e.g. cavities corresponding to components in the base portion) may be formed in or attached to the lid portion. The lid portion may also be formed from a different material to the base portion. For example, the base portion may be formed from silicon, whilst the lid portion is formed from GaAs. This would enable alignment slots to be formed in the silicon base portion whilst control electronics and/or electro-optic components (e.g. photo-diodes, lasers etc) are formed in the GaAs lid portion.

The use of sections of hollow core waveguide to couple the various optical components reduces the optical losses associated with fibre coupled systems and removes dispersion effects associated with free-space systems. Furthermore, forming the hollow core optical waveguide and the alignment slots in a common substrate allows the optical components to be precisely aligned with the hollow core optical waveguide thereby maximising optical efficiency.

Figure 3:
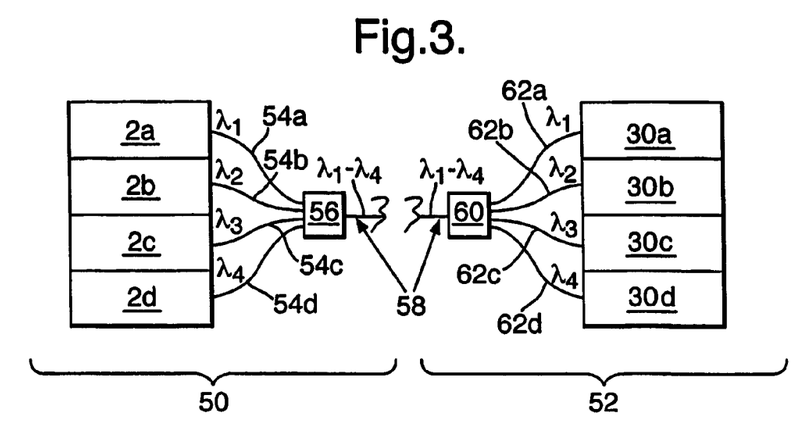
FIG. 3 shows a number of transmitter modules and receiver modules used in a multiple wavelength optical communications system.

Referring to FIG. 3, it is shown how a plurality of transmitter modules 2a-2d of the type described with reference to FIG. 1 and a plurality of receiver modules 30a-30d of the type described with reference to FIG. 2 can be used to implement a multiple wavelength optical communications network. The communications network comprises a transmitter portion 50 and a receiver portion 52.

The transmitter portion 50 comprises a first transmitter module 2a arranged to generate radiation of wavelength $\lambda_1$, a second transmitter module 2b arranged to generate radiation of wavelength $\lambda_2$, a third transmitter module 2c arranged to generate radiation of wavelength $\lambda_3$ and a fourth transmitter module 2d arranged to generate radiation of wavelength $\lambda_4$. Each light beam is intensity modulated to carry information.

The four intensity modulated beams ($\lambda_1$ to $\lambda_4$) are carried from their respective transmitter modules in short lengths of optical fibre 54a-54d to a multiplexer 56. The multiplexer 56 is arranged to combine the beams and to couple them into a single transmission optical fibre 58. The transmission optical fibre 58 may be many kilometers long, and one or more amplification nodes such as erbium doped amplifiers (not shown) may be provided at points along its length if required. A suitable hollow core EDFA is described in a co-pending GB patent application having the agent's reference QIP/P7294.

The receiver portion 52 comprises a demultiplexer 60 which receives the combined ($\lambda_1$ to $\lambda_4$) beams from the transmission optical fibre 58 and separates out the four wavelength components. Short lengths of optical fibre 62a-62d are used to couple radiation of wavelength $\lambda_1$ to the first receiver module 30a, radiation of wavelength $\lambda_2$ to the second receiver module 30b, radiation of wavelength $\lambda_3$ to the third receiver module 30c, and radiation of wavelength $\lambda_4$ to the fourth receiver module 30d. Each receiver module converts the intensity modulated signal into an electrical signal.

The transmitter portion and the receiver portion are each fabricated using a silicon substrate; typically the substrate comprises a base portion (in which alignment slots for optical components and waveguide channels are formed) and a lid portion. This arrangement allows each portion to be significantly smaller than prior art systems which comprise a number of components (e.g. laser, optical isolators, modulators etc) that are individually packaged and linked by lengths of optical fibre. Fabricating transmitters and receivers of the present invention is also less complex than prior art fibre coupled systems, and may be performed using automated "pick and place" manufacturing techniques.

Although FIG. 3 shows discrete, fibre coupled, multiplexer/demultiplexer components that are used in combination with separate transmit/receive modules it is also possible to form/locate such components on the same substrate as the associated transmit or receive module. Multiplexers and demultiplexers that can be implemented using hollow core optical waveguides are described in more detail in pending GB patent application 0306634.7. In such an arrangement, the optical fibres 54 and 62 may, be replaced with hollow core optical waveguides formed in the substrate. This arrangement further reduces the optical losses of the system.

Although a four wavelength system in described above, the skilled person would appreciate that a fewer or greater dumber of wavelength channels could be used as required. Furthermore, although the system shown in FIG. 3 is arranged to transmit data in a single direction, it would also be possible to implement two-way data transmission/receipt systems. For example, a combined transmit/receive portion could comprise one or more transmitter modules of the type described with reference to FIG. 1 and one or more receiver modules of the type described with reference to FIG. 2.

Figure 4:
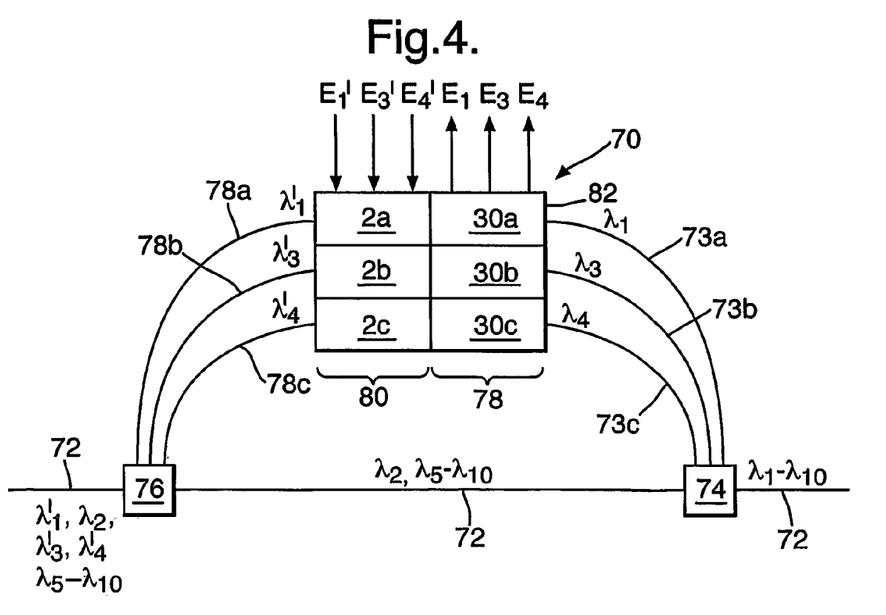
FIG. 4 illustrates how such a device may be used as an intermediate node in a multiple wavelength optical communications network.

Referring to FIG. 4, a combined transmit/receive device 70 is shown for inclusion at a point along a multiple wavelength optical fibre transmission line 72 that is arranged to carry, say, ten signal beams of different wavelength ($\lambda_1$ to $\lambda_{10}$). A drop demultiplexer 74 is arranged to direct up to three of the ten signal beams to the transmit/receive device 70 and a add demultiplexer 76 is arranged to add up to three beams to the fibre transmission line.

The transmit/receiver device comprises a receive stage 78 and a transmit stage 80. The receive stage 78 comprises three receiver modules 30a-30c of the type described with reference to FIG. 2 and the transmit stage 80 comprises three transmitter modules 2a-2c of the type described with reference to FIG. 1. The receive and transmit stages are formed in a common silicon substrate 82 and thus provide a more compact arrangement than that possible using a plurality of fibre coupled optical components.

In use, the drop demultiplexer extracts up to three of the wavelength channels (say $\lambda_1$, $\lambda_3$ and $\lambda_4$) from the fibre transmission line 72 and directs each wavelength via optical fibres 73a-73c to associated receiver modules 30a-30c. In this example, wavelength $\lambda_1$ is directed to the first receiver module 30a, wavelength $\lambda_3$ is directed to the second receiver module 30b, and wavelength $\lambda_4$ is directed to the third receiver module 30a.

Each receiver module 30a-30c extracts the information carried in the modulated light beam, and outputs an electrical signal ($E_1$, $E_3$ and $E_4$) carrying this information. Typically, such information would comprise digitally encoded data. The transmitter modules 30a-30c are each arranged to receive data in the form of digitally encoded electrical signals (say $E_1'$, $E_3'$ and $E_4'$) and convert the electrical signals into intensity modulated optical beams $\lambda_1'$, $\lambda_3'$ and $\lambda_4'$. These beam are then optically coupled, via optical fibres 78a-78c, into the transmission optical fibre transmission line 72 by the add multiplexer 76.

In this way, it is possible to extract data carried as wavelengths $\lambda_1$, $\lambda_3$ and $\lambda_4$ from the optical fibre transmission line 72 and insert optical beams $\lambda_1'$, $\lambda_3'$ and $\lambda_4'$ carrying different data. Optical beams $\lambda_2$ and $\lambda_{5-10}$ bypass the transmit/receive device 70 altogether.

The newly generated optical beams $\lambda_1'$, $\lambda_3'$ and $\lambda_4'$ must be of the same wavelength as the extracted beams $\lambda_1$, $\lambda_3$ and $\lambda_4$ or be arranged to be of a wavelength not already being used to transmit data through the fibre. In other words, any beam coupled back into the fibre transmission line must be of a different wavelength to any beams already propagating through (and not extracted from) the fibre. Hence, if the wavelength of a laser in a transmit module is fixed, it is only possible to use that module to add a beam to the transmission fibre if the corresponding wavelength beam is extracted from the optical fibre or is not propagating through the fibre in the first place. A tunable laser may be used in one or more of the transmitter modules forming the transmit stage 80, if required, to allow a transmitter module to output any one of a number of different wavelengths. This increases the flexibility of the arrangement.

It should also be noted that the drop demultiplexer 74, the add multiplexer 76 and the transmit/receive device 70 may all be formed on a common substrate. For example, optical add/drop multiplexers (OADMs) or re-configurable optical add/drop multiplexers (ROADMs) may be used. In such an arrangement, hollow core optical waveguides may be formed in the substrate to replace the optical fibres 73 and 78 and to carry the bypass beam from the drop demultiplexer to the add multiplexer. This further reduces optical losses and further increases the compactness of the arrangement.

The apparatus may also be dimensioned to exploit the so-called "re-imaging" phenomena that is found with multi-mode waveguides. The length between the optical components may be selected to be the re-imaging length (or a multiple thereof) of the hollow core waveguide such that, for a multi-mode waveguide of given cross-section dimensions, an image of the input beam profile is reproduced in the vicinity of the components.

The re-imaging effect is described in more detail elsewhere; for example see PCT patent application GB2003/000331. In short, it has been found that multi-mode waveguides (in particular those with a rectangular cross-section) can be designed to provide re-imaging of symmetric, anti-symmetric or asymmetric optical fields of a given wavelength by designing the length of the waveguide to have an appropriate relationship to its width and depth. In other words, the Gaussian input profile of a input beam is re-imaged (i.e. reproduced) after propagating a certain distance along a given waveguide. This effect also gives rise to beam replication; i.e. multiple images of the beam being formed at distances shorter than the re-imaging length. These effects have been described previously in U.S. Pat. No. 5,410,625 and provides the basis for multi-mode interference (MMI) beam splitting devices.

As an example, consider a symmetric field in a square sectioned waveguide. This will have a re-imaging length that is given by the square of the waveguide width over the wavelength of the propagating radiation. Re-imaging of the symmetric field occurs at the re-imaging length and multiples of the re-imaging length. For the case of a 50.0 μm wide hollow waveguide and 1.55 μm radiation, the re-imaging length is thus 1.613 mm. The symmetric field would be re-imaged at this length and also at integer multiples of this length, i.e. 3.23 mm, 4.84 mm etc. For example, a $TEM_{00}$ Gaussian input beam from a single mode optical fibre could be re-imaged at distances of 1.613 mm.

Alternatively, for the case of an asymmetric optical field, re-imaging occurs at eight times the length required for symmetric field re-imaging, i.e. at 12.09 mm for a 50.0 μm wide hollow waveguide. A mirror image of the asymmetric field is also formed at half this length i.e. at 6.05 mm. In particular, offsetting the input from the centre line of the multimode region provides an asymmetric input that is re-imaged at pre-determined distances along the guide at an equivalent offset on either side of the centre line.

In the case of a rectangular waveguide where the depth and width of the waveguide are substantially different, the re-imaging lengths associated with the two waveguide cross-sectional dimensions (e.g. depth and width) are themselves different. However, by arranging that the relationship between the dimensions of the rectangular hollow waveguide is such that re-imaging is produced at identical lengths for the particular width and depth, any field can be re-imaged. Thus, a symmetric field can be re-imaged in a hollow rectangular waveguide by arranging that the re-imaging lengths associated with axes of width $w_1$ and $w_2$ to be identical. The use of tapered waveguides also allows beam expansion or compression.

A re-imaging implementation has the advantage that collimating means (e.g. lenses) are not required in order to couple light between the hollow core waveguides and the associated optical fibres.

The invention claimed is:

1. A transmitter apparatus comprising:
   one or more lasers,
   modulation means for information modulating radiation output by each of said one or more lasers,
   output means for outputting the modulated radiation produced by the modulation means; and
   hollow core optical waveguides formed in a substrate for guiding radiation from the one or more lasers to the modulation means and from the modulation means to the output means, wherein said substrate comprises a silicon on insulator (SOI) wafer.

2. An apparatus according to claim 1 wherein at least one of the one or more lasers and the modulation means is a discrete component.

3. An apparatus according to claim 2 wherein said discrete component is located in an alignment slot formed in the substrate.

4. An apparatus according to claim 1 wherein at least one of the one or more lasers and the modulation means is a monolithic component formed in the substrate.

5. An apparatus according to claim 1 wherein the output means is arranged to couple the modulated radiation into at least one output optical fibre.

6. An apparatus according to claim 5 wherein the output means comprises at least one fibre attachment means.

7. An apparatus according to claim 6 wherein at least one optical fibre attachment means is arranged to receive a lensed output optical fibre.

8. An apparatus according to claims 6 wherein at least one optical fibre attachment means comprises a mode matching means.

9. An apparatus according to claim 1 comprising one laser.

10. A transmitter apparatus comprising:
    a plurality of lasers,
    modulation means for information modulating radiation output by each of said plurality of lasers,
    output means for outputting the modulated radiation produced by the modulation means; and
    hollow core optical waveguides formed in a substrate for guiding radiation from the plurality of lasers to the modulation means and from the modulation means to the output means, wherein said substrate comprises a silicon on insulator (SOI) wafer.

11. An apparatus according to claim 10 wherein each of said plurality of lasers have a different output wavelength.

12. An apparatus according to claim 11 wherein beam combining means are additionally provided to combine the plurality of modulated beams into a combined beam wherein said output means is arranged to couple the combined beam into a single output optical fibre.

13. An apparatus according to claim 10 wherein said output means is arranged to couple each of said plurality of modulated beams into one of a plurality of output optical fibres.

14. An apparatus according to claim 1 wherein one of said one or more lasers is a semiconductor laser.

15. An apparatus according to claim 14 wherein said semiconductor laser is a wavelength tunable semiconductor laser.

16. An apparatus according to claim 1 wherein one or more detectors are provided to monitor the intensity of radiation output by said one or more lasers.

17. An apparatus according to claim 1 and further comprising at least one optical isolator.

18. An apparatus according to claim 1 wherein one or more beam shaping means are provided.

19. An apparatus according to claim 18 wherein at least one of said beam shaping means comprise one or more lenses.

20. A transmitter apparatus comprising:
one or more lasers,
modulation means for information modulating radiation output by each of said one or more lasers,
output means for outputting the modulated radiation produced by the modulation means;
hollow core optical waveguides formed in a substrate for guiding radiation from the one or more lasers to the modulation means and from the modulation means to the output means; and
one or more beam shaping means are provided, wherein at least one of said beam shaping means comprises a tapered hollow core optical waveguide, wherein said substrate comprises a silicon on insulator (SOI) wafer.

21. An apparatus according to claim 1 wherein said modulation means comprises one or more electro-optic modulators.

22. A transmitter apparatus comprising:
at least one laser for producing information modulated radiation;
output means for coupling the radiation produced by the laser into at least one output optical fibre; and
hollow core optical waveguides formed in a substrate for guiding radiation from the at least one laser to the at least one output optical fibre, wherein said modulation means comprises one or more electro-optic modulators, wherein said substrate comprises a silicon on insulator (SOI) wafer.

23. An information modulated radiation receiver apparatus comprising:
at least one hollow core optical waveguide formed in a substrate;
one or more detectors; and
one or more optical fibre attachment means, the one or more optical fibre attachment means adapted to receive one or more optical fibres, wherein said radiation is guided from the one or more optical fibres to the one or more detectors by said at least one hollow core optical waveguide, said at least one hollow core waveguide guiding said radiation in two transverse directions, wherein said substrate comprises a silicon on insulator (SOI) wafer and further comprising at least one variable optical attenuator arranged to provide controllable attenuation of the radiation received from said at least one optical fibre.

24. An apparatus according to claim 23 wherein said receiver apparatus comprises a plurality of detectors.

25. An apparatus according to claim 24 wherein said receiver apparatus includes a plurality of optical fibre attachment means for receiving a plurality of optical fibres.

26. An apparatus according to claim 25 wherein, said receiver apparatus receives radiation from each of said plurality of optical fibres which is guided to one of the plurality of detectors.

27. An apparatus according to claims 24 wherein in said receiver apparatus one optical fibre attachment means is provided, said optical fibre attachment means is arranged to receive one optical fibre carrying radiation comprising a plurality of different wavelength channels.

28. An apparatus according to claim 27, said receiver apparatus further comprising wavelength demultiplexing means, said wavelength demultiplexing means is arranged to separate said different wavelength channels and to direct each wavelength channel to one of the plurality of detectors.

29. An apparatus according to claim 23 and said receiver apparatus further comprising at least one wavelength selective filter.

30. An apparatus according to claim 23 wherein at least one optical fibre attachment means comprises a mode matching means.

31. An apparatus according to claim 23 wherein at least one optical fibre attachment means is arranged to receive a lensed optical fibre.

32. An transmit/receive apparatus comprising transmitter apparatus as claimed in claim 1 and receiver apparatus.

33. Apparatus according to claim 32 wherein said transmitter apparatus and said receiver apparatus are formed on a common substrate.

34. An apparatus according to claim 1 wherein the substrate comprises semiconductor material.

35. An apparatus according to claim 1 formed by microfabrication techniques.

36. An apparatus according to claim 35 wherein the microfabrication technique includes deep reactive ion etching.

37. An apparatus according to claim 1 wherein the hollow core optical waveguides are of substantially rectangular cross section.

38. An apparatus according to claim 1 wherein the hollow core optical waveguides are dimensioned to preferably guide radiation propagating in the fundamental mode.

39. An apparatus according to claim 1 wherein the hollow core optical waveguides are dimensioned to preferably guide radiation propagating in multiple optical modes.

40. An apparatus according to claim 1 wherein the internal surfaces of the hollow core optical waveguides carry a reflective coating.

41. An apparatus according to claim 1 wherein the substrate comprises a base portion and a lid portion.

42. A transmitter apparatus comprising:
one or more lasers,
at least one electro-optic modulator for information modulating radiation output by each of said one or more lasers,
a transmitter for outputting the modulated radiation produced by the modulator; and
hollow core optical waveguides formed in a substrate for guiding radiation from the one or more lasers to the modulator and from the modulator to the transmitter, wherein said substrate comprises a silicon on insulator (SOI) wafer.

* * * * *